United States Patent
Murray

(10) Patent No.: US 6,177,638 B1
(45) Date of Patent: Jan. 23, 2001

(54) PORTABLE LOAD SCALE FOR UNEVEN TERRAIN

(76) Inventor: Clifford K. Murray, 133 Highland Park Rd., Brunswick, GA (US) 31525

(*) Notice: Under 35 U.S.C. 154(b), the term of this patent shall be extended for 0 days.

(21) Appl. No.: 09/482,233

(22) Filed: Jan. 13, 2000

(51) Int. Cl.[7] .................................................. G01G 19/02
(52) U.S. Cl. .......................................................... 177/133
(58) Field of Search ..................................... 177/126, 127, 177/132, 133, 134, 135, DIG. 9

(56) References Cited

U.S. PATENT DOCUMENTS

| 4,134,467 | 1/1979 | Czyryk | 177/133 |
| 4,203,497 | 5/1980 | Harris et al. | 177/134 |
| 4,281,728 | 8/1981 | Dickason et al. | 177/134 |
| 4,453,606 | 6/1984 | Mokhbery et al. | 177/126 |
| 4,549,622 | 10/1985 | Leiman | 177/134 |
| 4,554,987 | 11/1985 | Dillon | 177/134 |
| 4,828,055 | 5/1989 | Hamilton et al. | 177/134 |
| 4,880,069 * | 11/1989 | Bradley | 177/211 |
| 4,992,775 * | 2/1991 | Castle et al. | 177/132 |
| 5,600,104 | 2/1997 | McCauley et al. | 177/136 |
| 5,894,112 * | 4/1999 | Kroll | 177/134 |

* cited by examiner

Primary Examiner—Randy W. Gibson
(74) Attorney, Agent, or Firm—Thomas C. Saitta

(57) ABSTRACT

A portable load scale for use in rugged terrain or at locations without suitable support pads, the load scale having a support deck affixed to a base platform through a plural number of load cells, where the base platform is constructed to provide ramp members joined by longitudinal runner assemblies to form a rigid, non-flexing assembly having a central gap and gaps between pairs of ramp members to reduce the standard rectangular footprint by approximately 30 percent. The runner assemblies are constructed so that the bottom of the support deck is separated from the top of the base plate of the runner assemblies by a distance of several inches so that debris will not impede the operation of the load scale. The load cells are mounted onto the underside of the support deck and joined to the base platform by ball bushings such that the load cells can pivot in any or all axis directions relative to the base platform to relieve stresses induced by uneven terrain.

9 Claims, 4 Drawing Sheets

PORTABLE LOAD SCALE FOR UNEVEN TERRAIN

BACKGROUND OF THE INVENTION

This invention relates in general to load or weighing scales used to measure the weight of a wheeled vehicle or trailer, and more particularly to load scales which are self-contained and portable as opposed to being installed in a fixed, in-ground installation. Even more particularly, the invention relates to such scales which comprise a drive-on base platform suitable for use on relatively rugged and uneven terrain without underlying concrete slabs, poured floors or road surfaces.

Scales for determining the total weight of a loaded truck or trailer where the vehicle or trailer is driven onto the load scale such that the wheels of the vehicle or trailer are positioned on the scale are well known. Some such scales are permanently installed in a roadbed, such as the weigh stations found along interstates. There are many other circumstances in which vehicle or trailer load weights need to be determined where a permanent installation is not warranted or possible, and for this purpose portable or stand-alone load scale platforms have been developed. These portable scales typically comprise a base or foundation platform with ramps on two opposing sides and a "floating" support deck or weight platform mounted a short distance above the base platform on a plural number of compressible scale devices known as load cells. When a wheeled vehicle is driven up the ramp and the wheels positioned on the support deck, the support deck and load cells are compressed relative to the base platform and provide an indication of the weight of the load through electronic metering and indicator means. Usually four load cells are symmetrically positioned beneath the support deck.

Examples of such load scales can be seen in U.S. Pat. No. 3,933,212 to Bradley et al., U.S. Pat. No. 4,203,497 to Harris et al., U.S. Pat. No. 4,453,606 to Mokhbery et al., and U.S. Pat. No. 4,979,581 to Kroll. The constructions of these load scales presuppose that the scales will be used on a flat and level concrete slab or other suitable floor-like surface, and as such little consideration has been given to outdoor or off-surface applications. Use of a load scale placed directly on uneven ground without an underlying support slab requires a construction which is not much addressed in the known devices, as most previous devices are not sufficiently strong to stand alone without underlying support. In addition, some of the known devices have solid, co-extensive foundation or base plates which require a flat surface in order for the device to properly function, meaning that the ground must be prepared prior to use and the devices cannot be employed where roots or rocks are present. Any uneven in the ground underneath the load scale causes the scale to flex and torque, resulting in inaccurate weight readings, sometimes to such an extent that the readings are useless. There is a great need for easily portable load scales suitable for use on rugged terrain at varying locations. For example, log trailers loaded in the field are not allowed to carry more than a predetermined maximum load and overloading can result in the assessment of fines. Without a scale at the loading site, the loader operators must make estimates as to the total weight, and typically under-load the trailer by a substantial amount to provide for a margin of error. This results in lost profits as each trailer load is not maximized.

Some prior art addresses the problems associated with placement of a portable load scale onto uneven terrain or the problems of asymmetrical loading by presenting somewhat complicated mounting systems. Examples of these devices are shown in U.S. Pat. No. 5,600,104 to McCauley et al., U.S. Pat. No. 4,828,055 to Hamilton et al., U.S. Pat. No. 4,134,467 to Czyryk, U.S. Pat. No. 4,545,622 to Leiman, U.S. Pat. No. 4,554,987 to Dillon, U.S. Pat. No. 4,281,728 to Dickason et al., and U.S. Pat. No. 4,148,371 to Nelson. McCauley et al. utilizes a spherical ball bearing support with loosely mounted vertical bolts which allow for relative angular movement. Hamilton et al. uses pins, rollers and slots. Czyryk uses a ball and socket arrangement. Leiman uses pivoting chairs and roller supports. Dillon uses rocking posts with curved bottoms and tops. Dickason et al. uses pivot pins. Nelson uses levers mounted on pivot pins.

It is an object of this invention to provide a portable load scale which can be used without an underlying slab or support structure, such that the load scale can be placed directly onto the ground and will perform on relatively rugged and uneven terrain. It is a further object to provide such a load scale where the weigh platform is mounted onto the base platform such that the load cells are attached directly to the weigh platform, with the cells attached to a rocker member containing a ball bushing to reduce friction and allow relative motion in three dimensions, with the rocker assembly retained in a bracket chair attached to the base platform by a pin inserted through the bushing. It is a further object to provide such a load scale where the base platform is constructed to provide high structural rigidity when a wheeled vehicle or trailer is driven onto the scale, where opposing ramps are connected by a pair of runner assemblies aligned so as to be directly under the vehicle wheels as the wheels pass on, across and off the scale. It is a further object to provide such a scale where the floating support deck is extremely rigid and where the bottom of the support deck is maintained a sufficient distance above the ground and the base plates of the runner assemblies such that any debris which falls between the support deck and ground or base plate will not impair the vertical movement of the scale. It is a still further object to provide such a load scale where the load information ascertained by the load cells may be transmitted by radio frequency to a visible read-out device or by direct wire connection, such that the read-out device can be located in the most desirable location, such as in the cab of a loader separate from the truck or trailer, and can be easily relocated in different loaders if needed.

SUMMARY OF THE INVENTION

The invention is a portable load or weighing scale suitable for use without an underlying support slab which can be transported to an outdoor, off-road location and placed directly onto the ground, yet which is still sufficiently strong and rigid to accommodate large loads on trucks or trailers and provide an accurate measurement of the load weight. The scale comprises in general a unitary base platform having a set of opposing ramps, and preferably ramp pairs, to allow wheels to roll on and off the device, where the ramps are rigidly connected by a pair of lateral bridging members and a pair of longitudinal runner assemblies aligned in parallel manner with a separation gap in the middle. The runner assemblies each comprises a rectangular longitudinal support beam buttressed by vertically oriented braces and mounted onto a flat footing or base plate member, with the upper surface of each beam being several inches above the footing member. A floating support deck or weighing platform is constructed of a top plate joined to a bottom plate with a number of internal reinforcing members to create a rigid sandwich which will not flex under the load. Four load cells are attached to the underside of the support deck. A rocker member comprising a mounting flange and a depending sleeve member is connected to each load cell. A ball bushing member is positioned within each sleeve member. The rocker members are each pivotally connected to a chair bracket mounted in a recess between pairs of longitudinal support beams by passing a pin through the chair bracket and into the ball bushing positioned within the sleeve member of the rocker member. The bottom plate of the support deck is preferably maintained more than approximately 4 inches above the footing member of the base platform. The load cells are connected in communicating manner to a transmitter device, such that when a vehicle or trailer is driven onto the scale, thereby compressing the support deck and load cells, the weight information is sent to a remote receiver device and presented in a visible form.

DETAILED DESCRIPTION OF THE INVENTION

Figure 1:
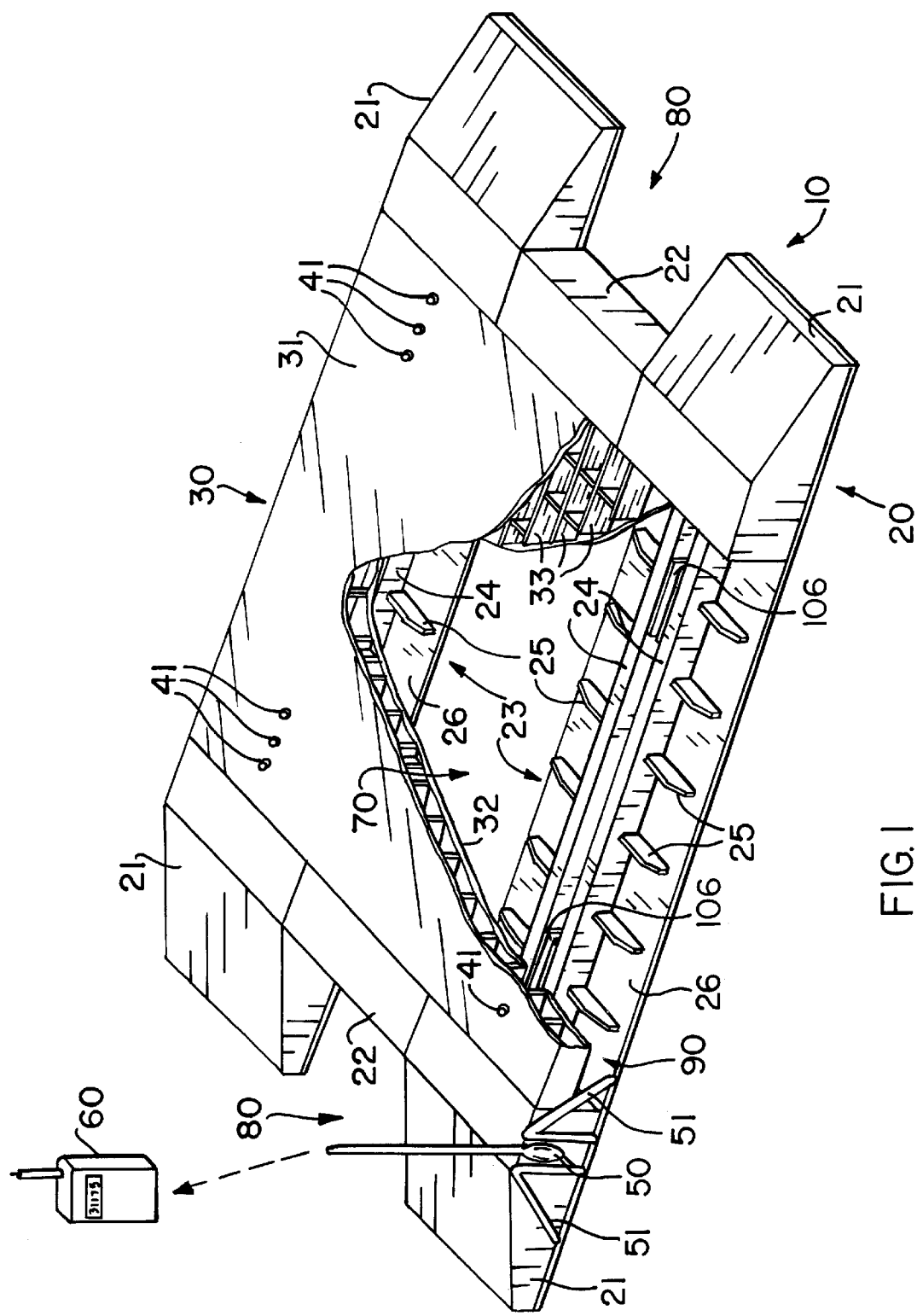
FIG. 1 is a perspective view of the load scale of the invention with a portion of the support deck removed to expose the runner assemblies, load cells and internal reinforcing members.

With reference to the drawings, the invention will now be described in detail with regard for the best mode and the preferred embodiment. As best shown in FIG. 1, the invention is a portable load or weighing scale 10 suitable for use on rugged or uneven terrain. The load scale 10 comprises in general a base platform 20, a floating support deck 30 capable of a small amount of vertical movement relative to the base platform 20, weighing or scale devices known as load cells 40 positioned between the base platform 20 and the support deck 30 to measure downward force when the wheels of a vehicle or trailer are driven onto the support deck 30, transmitter means 50 mounted on the load scale 10 to preferably transmit by radio frequency or other non-wire means the information from the load cells 40 to an independently located remote receiver and display means 60, which calculates and displays a visual indication of the load weight present on the load scale 10. As the load scale 10 may be subjected to heavy loads up to 80,000 pounds, it is imperative that the invention be constructed of high strength material such as steel plate or the like, and that the joined component parts be securely mated such as by welding.

The base or foundation platform 20 comprises ramp members 21 mounted on opposing ends of the load scale 10. The ramp members 21 provide a transition for the wheels to roll up from the ground onto the support deck 30 and then off the other side. Ramp members 21 may consist of one fully extensive ramp member 21 on each side of the load scale, but it is preferable that the ramp members 21 total four in number, with a pair of ramp members 21 positioned on opposing sides of the base platform 20 such that each pair is separated by a distance to define a ramp gap 80 therebetween. The separate ramp members 21 on opposing sides are aligned longitudinally across the load scale 10 to define a pair of wheel pathways corresponding to the normal distance between the wheels on a given axle of a truck or trailer. For example, the base platform 10 will ideally extend approximately nine feet across in the lateral direction, with each of the ramp members 21 extending approximately three feet in the lateral direction with an approximate separation ramp gap 80 of three feet.

Figure 2:
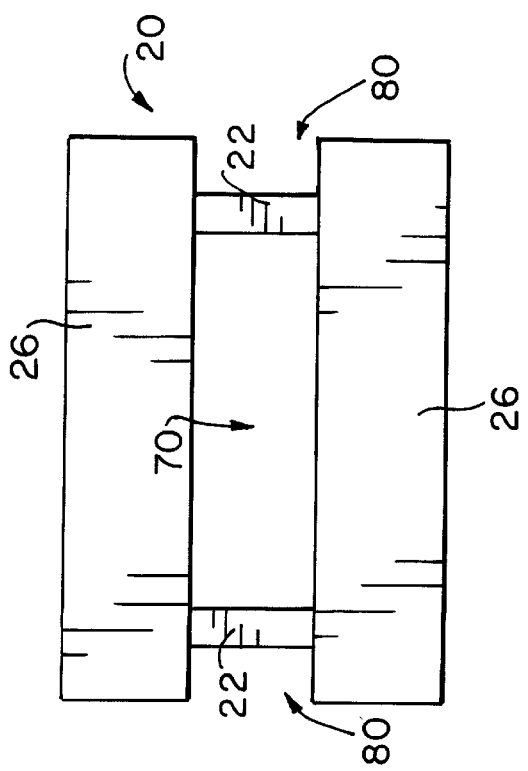
FIG. 2 is a bottom view of the base platform.

Extending between the ramp members 21 along the longitudinal wheel pathways are two separate runner assemblies 23. The runner assemblies 23 each comprise a base or footing plate 26, a pair of longitudinal support beams 24 and bracing members 25. Base plate 26 is a planar member preferably composed of 3/8 inch steel plate approximately three feet in lateral dimension to correspond to the width of the ramp members 21. An approximate length of almost sixteen feet is preferable to allow for a square support deck 20 of sufficient length to receive the wheels of double axle trucks or trailers, although the support deck 20 can be rectangular if desired, plus an extension on each end of about two and one half feet to support the ramp members 21. The ramp members 21 and the runner assemblies 23 are rigidly joined by lateral bridging members 22, preferably rectangular in configuration, to form a base platform 20 having a large central gap 70 defined by the borders of the inner edges of the opposing lateral bridging members 22 and the opposing runner assemblies 23, such that the underside of the load scale 10 appears as shown in FIG. 2. As seen, the underside of the base platform 20 consists of the base plates 26 of the two runner assemblies 23 and the lateral bridging members 22, arranged such that the primary areas of support are located on the two wheel pathways. Thus, rather than providing a square or rectangular footprint for the base platform 20, the base platform 20 is seen to comprise a pair of extended, parallel wheel pathways approximately three feet in width by almost sixteen feet in length, formed by the base plates 26, joined together by a pair of lateral bridging members 22 approximately one foot by three foot. With the dimensions as presented, this results in a reduction in footprint size of more than 25 percent as compared to a solid-bottom rectangular footprint.

Each runner assembly 23 has mounted onto each base plate 26 a pair of longitudinally extending, parallel, support beams 24, which are preferably approximately four inches square, formed of 1/2 inch thick steel beam material, and separated approximately 4 inches. Attached at spaced intervals to either side of the support beam 24s are bracing members 25, which preferably consist of steel plate welded to the support beams 24 and to the upper surface of the footing plate 26. The chair brackets 106 are mounted in the recesses between the support beam pairs 24 and receive the rocker assemblies 101 attached to the load cells 40 on the support platform 30, such that the runner assemblies 23 directly support the support deck 30 and the load weight. This construction allows the force of the load on the support deck 30 to be dispersed down through the support beam 24 bracing members 25 and laterally across the base plates 26, which in combination with the underside of the lateral bridging members 22 prevent the load scale 10 from sinking into the ground even when subjected to loads of up to 80,000 pounds. The construction of the runner assemblies 23, in conjunction with the combined rigidity of the lateral bridging members 22 and the ramp members 21, likewise prevents the base platform 20 from bending excessively in the longitudinal direction when the load is positioned on the load scale 10.

Load cells 40 of any of the well known types capable of withstanding and measuring large weights, such as for example VULCAN SUPER-BEAM brand 15 inch side connector load cells, are symmetrically positioned on the underside of the top panel 31 of the support deck 30 in recesses 34. Load cells 40 are commonly employed in load scales, and typically are connected in communicating electrical manner to a means of translating and calculating the information derived by the load cells 40 into a visible readout of the measured weight. The load cells 40 are preferably affixed to the support deck 30 by mounting means 41, such as bolts. In the preferred embodiment, the load cells 40 are connected in known communicating manner to a transmitter means 50 which sends out information from the load cells 40 by radio frequency to an independent receiver and display means 60 which provides the visual read-out of the load weight. The transmitter means 50 is shown protected by guard members 51 to prevent accidental damage or destruction. The system is powered by one or more batteries, not shown but preferably mounted within the ramp members 21 or lateral bridging members 22, and such systems being well known, the exact components are not herein described.

Figure 3:
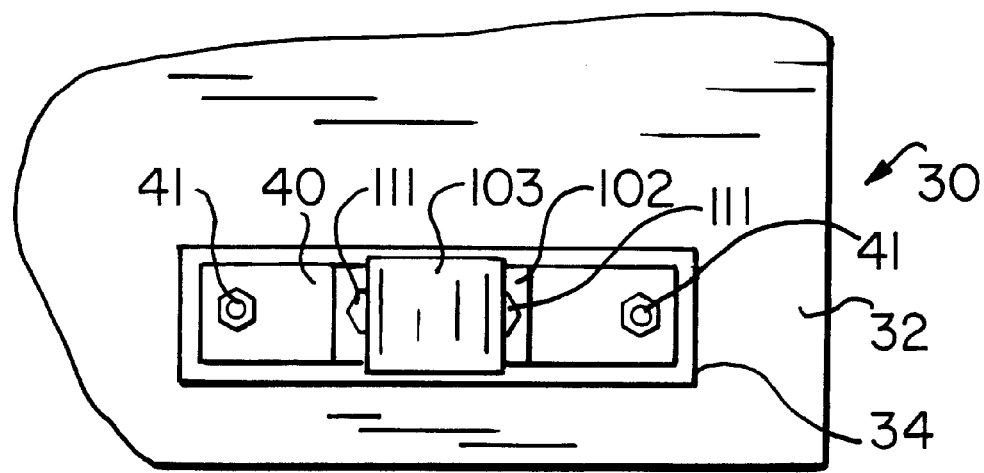
FIG. 3 is a bottom view of the support deck showing the pocket used to encase the load cell assemblies.

The support deck 30 is a structurally rigid and non-flexing composite member which comprises a planar top panel 31 and a planar bottom panel 32 joined by a number of internal reinforcing members 33 to form a sandwich construction. Preferably, the top panel 31 is formed of ½ to ⅜ inch steel plate and the bottom panel 32 is formed of ⅜ inch steel plate, with the reinforcing members 33 formed of steel plate positioned on edge and most preferably arranged in a perpendicularly intersecting pattern, as shown in the exposed potion of FIG. 1. It is imperative that the support deck 30 remain rigid and not flex under the load weight. The bottom panel 32 is provided with four load cell recesses or pockets 34, as shown in FIG. 3, to receive the load cells 40. The top panel 31 is provided with appropriately located mounting apertures 42 to receive mounting means 41 to affix the top panel 31 directly to the upper surface of the load cells 40. The upper surface of the top panel 31 rests approximately flush with the upper surface of the lateral bridging members 22 and the ramp members 21 when the load scale 10 is unloaded. A suitable height for the load scale 10 as constructed is approximately nine inches, with the support deck 30 being about four inches in height. Because the support deck 30 is mounted directly onto the load cells 40 and not connected to the base platform 20 in any other manner, the weight of a load on the support deck 30 will press it downward to compress the load cells 40 and provide a weight measurement.

Figure 5:
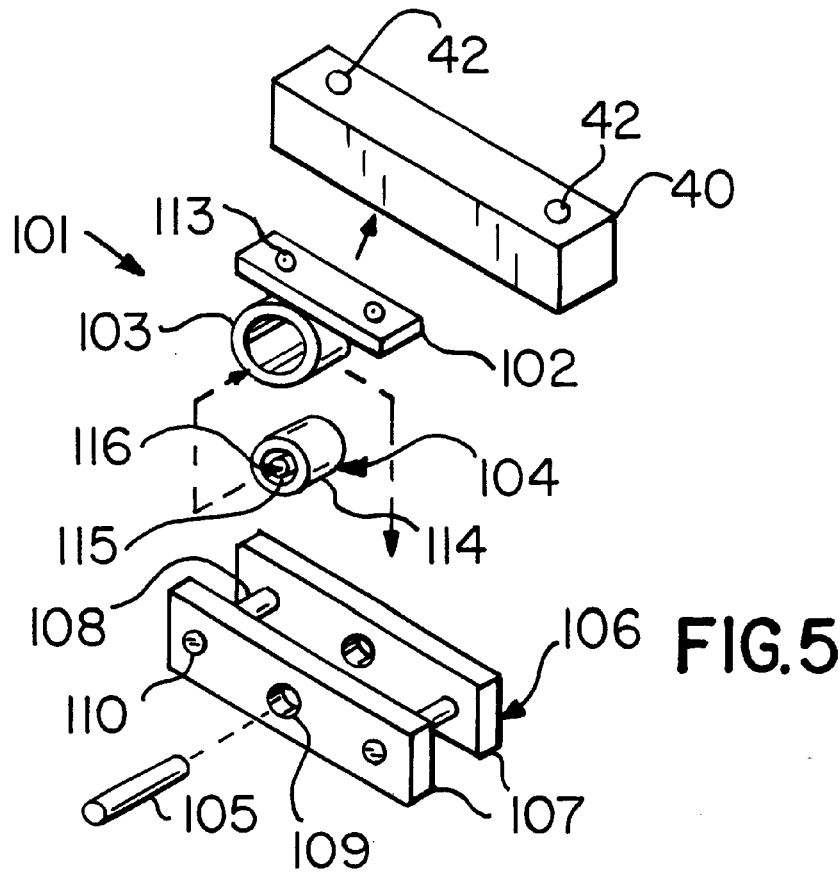
FIG. 5 is an expanded view of the load cell, rocker assembly and chair bracket.
Figure 6:
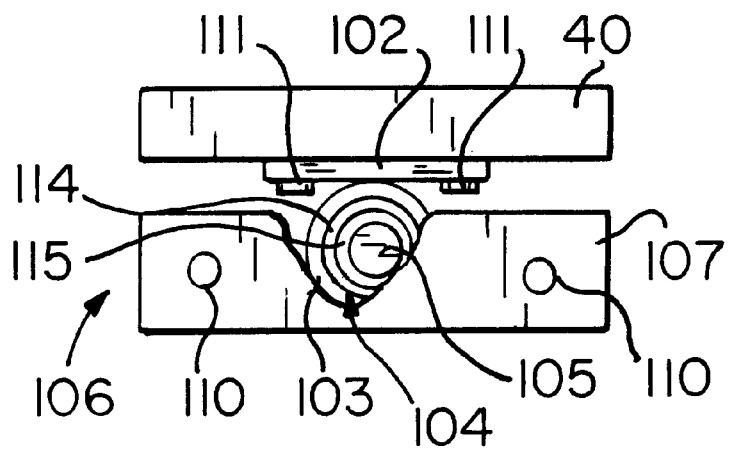
FIG. 6 is a si0de view of the assembled load cell, rocker assembly and chair bracket, with the chair bracket partially exposed.
Figure 7:
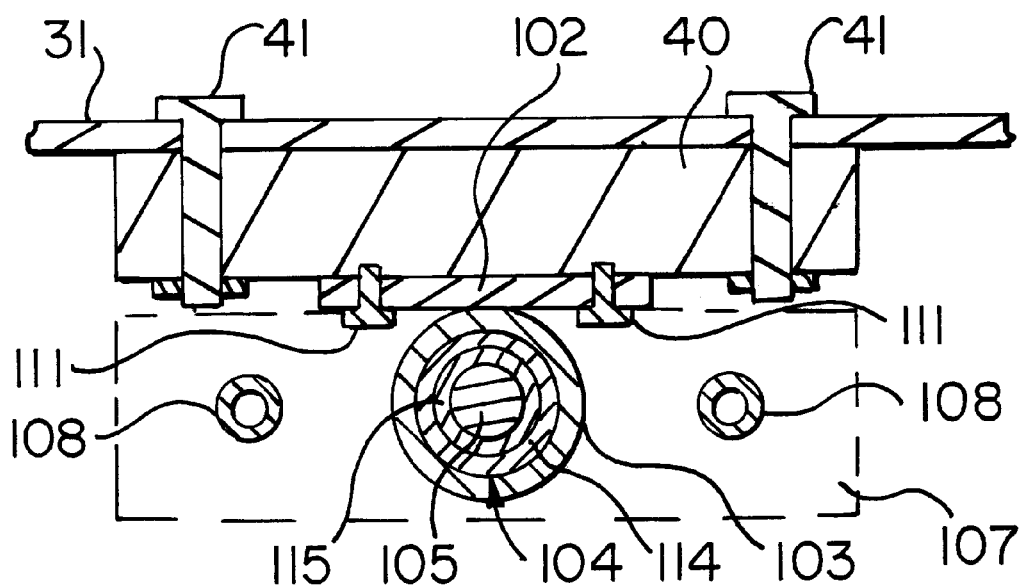
FIG. 7 is a cross-sectional view of the load cell and rocker assembly mounted onto the weight platform, with the chair bracket shown in outline.

As shown in FIGS. 5, 6 and 7, a rocker assembly 101 is connected to the underside of each load cell 40. Rocker assembly 101 comprises a generally planar mounting flange 102 joined to a sleeve member 103, where the central axis of the sleeve member is aligned perpendicular to the longitudinal axis of the mounting flange 103 and load cell 30 when attached. Mounting flange 102 contains rocker mounting apertures 113 which align with mounting apertures 42 in the bottom of the load cell 40, such that mounting means 41 such as a threaded bolt can be used to connect the rocker assembly 101 to the load cell 40. A ball bushing 104 is coaxially positioned within the sleeve member 103. The ball bushing 104 has a generally cylindrical outer housing 114 with a curved inner surface receiving the curved outer surface of the interior ball member 115 which has a cylindrical bore 116 passing transversely through. The rocker assembly 101 is pivotally connected to the chair bracket 106 mounted on the runner assembly 23. The chair bracket 106 comprises two upstanding side walls 107 separated by transverse tube braces 108, which align with mounting apertures 110 in the sides of the longitudinal support beams 24. Chair mounting means 112, such as a threaded bolt and nut combination, are inserted through the mounting apertures 110 and the tube braces 108 to secure the chair bracket 106 in position. The chair bracket 106 is provided with a pin aperture 109 to receive a pin 105 sized to match the interior bore 116 of the bushing 104, whereby the rocker assembly 101 is pivotally connected to the chair bracket 106 by inserting the pin 105 through the pin apertures 109 and busing 104.

This assembly mechanism allows the load cell 40 to pivot relative to the base platform 20 in any or all directions about all three axes. This is important to reduce or remove stresses on the load cells 40 and support deck 30 caused by the flexation or torqueing resulting from placement of the load scale 10 on uneven ground. Even though the construction of the load scale 10 as described produces a rigid structure, it has been found that by incorporating the rocker assembly 101 and chair bracket 106, the accuracy of the load scale is greatly improved. Tests on scales built without the rocker assemblies 101 and chair brackets 106 show that where care is not taken in the placement of the scale on uneven terrain, only about 50% of the weighings were within 1% of the true weight, with errors up to about 3 or 4%. In tests of a load scale 40 constructed as described herein with the rocker assemblies 101 and chair brackets 106, greater than 90% of the weighings were within 1% of the true weight, and errors were limited to about 1.5%.

Figure 4:
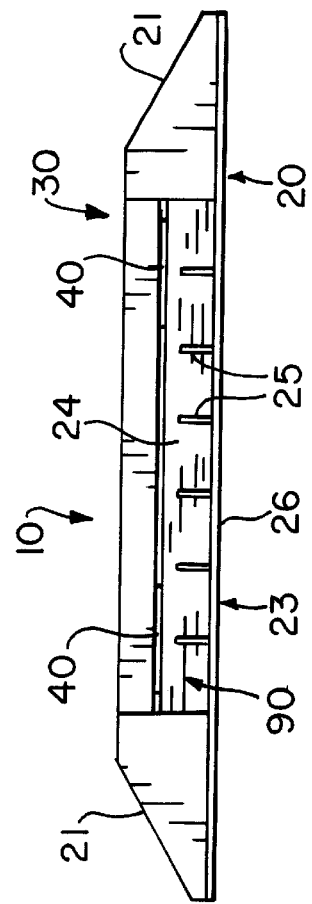
FIG. 4 is a side view of the load scale.

The height of the load cells 40, rocker assemblies 101 and chair brackets 106, in combination with any necessary mounting hardware or bearing pads, is sufficient to maintain the bottom panel 32 a small distance above the support beams 24 even when subjected to a maximum load. The design of the runner assemblies 23 therefore provides a relatively unobstructed clearance gap 90 in the vertical direction, as seen in FIG. 4. The clearance gap 90 is defined by the upper side of the base plate 26 of the base platform 20 and the underside of the bottom panel 32 of the support deck 30. Any debris which accidently falls into the clearance gap 90 will not impede or disrupt the accuracy of the load scale 10 unless it is an incompressible material over four inches thick, since the debris would have to be at least this height to contact the underside of the bottom panel 32. Likewise, no debris, rocks, roots or the like under approximately four inches in height which is present in the central gap 70 between the runner assemblies 23 will impede the operation of the support deck 30. The combination of the central gap 70 and the ramp gaps 80 also enables the load scale 10 to be placed on surfaces which are relatively uneven, since the contact area of the base platform 20 is reduced by approximately 25 to 30 percent.

In operation the load scale 10 is transported to the desired location, even a location where there is no perfectly flat, structurally rigid, support surface, and placed on the ground. The system is activated and a vehicle or trailer is driven or pulled onto the load scale 10 such that the wheels roll up the ramp members 21 and rest directly on the support deck 30. The weight compresses the load cells 40 and the information is transmitted by the transmitter means 50 to the receiver and display means 60, where the weight of the load is presented as a visible read-out. The receiver and display means 60 may be located at any suitable place, such as in the operator's cab of a piece of loading equipment. In this manner the operator can monitor the load as the trailer or truck is being loaded, such that the maximum allowable load is obtained. Using radio frequency rather than a wire to connect the load cells 40 to the display means 60 allows the display means 60 to be exchanged between loaders, as well as eliminating the problems associated with having communicating wires extending around heavy equipment sites.

It is contemplated that substitutions and equivalents for certain elements set forth above may be obvious to those skilled in the art, and therefore the true scope and definition of the invention is to be as set forth in the following claims.

I claim:

1. A portable load scale for weighing vehicles or trailers on rough terrain, the load scale comprising:
   (A) a base platform comprising at least two opposing ramp members, a pair of parallel runner assemblies each comprising a longitudinally extending base plate and a longitudinal support beam, said base plate being wider than said support beam, and lateral bridging members, where said runner assemblies connect said ramp members together to define two parallel wheel pathways and where said lateral bridging members connect said runner assemblies together to define a central gap open to the terrain beneath said base platform, whereby the footprint of said base platform is defined solely by said longitudinally extending base plates and said lateral bridging members;
   (B) a support deck supported by said base platform, said support deck comprising a top panel and a bottom panel joined by reinforcing members,
   (C) load cells mounted to said support deck, and
   (D) rocker assemblies connecting said load cells to said runner assemblies of said base platform, said rocker assemblies each comprising a ball bushing whereby said load cells and said base platform pivot relative to each other in any or all three axis directions.

2. The load scale of claim 1, where said rocker assemblies each further comprise a mounting flange joined to a sleeve member, said sleeve member receiving said ball bushing and said mounting flange being connected to one of said load cells, a chair bracket containing a pin aperture, and a pin which is inserted through said pin aperture and said ball bushing to secure said support deck to said base platform.

3. The load scale of claim 2, where each said opposing ramp member comprises a pair of ramp members separated by a ramp gap open to the terrain beneath said ramp members.

4. The load scale of claim 2, where the exterior longitudinal edges of said bottom panel of said support deck is separated from said base plate of said base platform by several inches to define a clearance gap, where said clearance gap is present even when said support deck is in the lowermost position under load.

5. The load scale of claim 2, where said runner assemblies further comprise bracing members joining each said support beam to each said base plate.

6. The load scale of claim 2, where said load cells are communicatingly connected to a transmitter means which sends radio frequency signals to a separate receiver and display means.

7. The load scale of claim 2, where said reinforcing members are arranged in perpendicular manner.

8. The load scale of claim 4, where said clearance gap is at least four inches.

9. The load scale of claim 2, where said base plates of said runner assemblies are approximately three feet by fourteen feet and said lateral bridging members are approximately one foot by three feet, and where said central gap is approximately three feet by nine feet.

* * * * *